United States Patent
Yamazaki et al.

(10) Patent No.: US 9,582,438 B2
(45) Date of Patent: Feb. 28, 2017

(54) METHOD AND APPARATUS FOR IDENTIFYING CAUSE OF INTERRUPT

(71) Applicant: FUJITSU LIMITED, Kawasaki-shi, Kanagawa (JP)

(72) Inventors: Yukio Yamazaki, Utsunomiya (JP); Masaaki Saito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 713 days.

(21) Appl. No.: 14/059,050

(22) Filed: Oct. 21, 2013

(65) Prior Publication Data
US 2014/0281091 A1    Sep. 18, 2014

(30) Foreign Application Priority Data
Mar. 18, 2013  (JP) .................................. 2013-055663

(51) Int. Cl.
*G06F 13/24* (2006.01)
*G06F 9/38* (2006.01)

(52) U.S. Cl.
CPC ............ *G06F 13/24* (2013.01); *G06F 9/3861* (2013.01)

(58) Field of Classification Search
CPC ............................... G06F 13/24; G06F 9/3861
USPC ....................................................... 710/267
See application file for complete search history.

(56) References Cited

U.S. PATENT DOCUMENTS

| | | | | |
|---|---|---|---|---|
| 3,509,541 A | * | 4/1970 | Gordon ................. | G06F 11/362 710/262 |
| 3,611,305 A | * | 10/1971 | Greenspan .............. | G06F 13/24 710/264 |
| 4,172,284 A | * | 10/1979 | Heinrich ................ | G06F 9/4881 710/264 |
| 4,275,458 A | * | 6/1981 | Khera ..................... | G06F 13/26 710/262 |
| 4,494,192 A | * | 1/1985 | Lew ........................ | G06F 13/26 710/112 |
| 5,512,893 A | * | 4/1996 | Gulick ................... | H03M 11/20 341/22 |

(Continued)

FOREIGN PATENT DOCUMENTS

| | | |
|---|---|---|
| JP | 03-256130 | 11/1991 |
| JP | 05-081040 | 4/1993 |

(Continued)

OTHER PUBLICATIONS

JPOA—Office Action mailed on Jul. 12, 2016 issued with respect to the basic Japanese Patent Application No. 2013-055663, with partial English translation.

*Primary Examiner* — Paul R Myers
(74) *Attorney, Agent, or Firm* — Fujitsu Patent Center

(57) ABSTRACT

A method of identifying a cause of an interrupt related to an interrupt indication received from an interrupt indicating circuit in a processor, includes the steps of having the interrupt indicating circuit provided with a plurality of lowest-layer registers having a plurality of bits, each of the plurality of bits corresponding to the cause of the interrupt, and one or more upper-layer registers for aggregating the plurality of lowest-layer registers; forming a hierarchical structure with the one or more upper-layer registers and the plurality of lowest-layer register; and identifying the cause of the interrupt by having the processor read the upper-layer registers and the lowest-layer registers in order following the hierarchical structure.

10 Claims, 6 Drawing Sheets

(56) References Cited

U.S. PATENT DOCUMENTS

| | | | | |
|---|---|---|---|---|
| 5,870,584 | A * | 2/1999 | Bennett | G06F 7/24 |
| | | | | 707/752 |
| 6,269,413 | B1 * | 7/2001 | Sherlock | G06F 3/0608 |
| | | | | 710/29 |
| 6,389,031 | B1 * | 5/2002 | Chao | H04L 12/5693 |
| | | | | 370/412 |
| 6,725,309 | B1 * | 4/2004 | Kim | G06F 13/26 |
| | | | | 710/260 |
| 6,845,419 | B1 * | 1/2005 | Moyer | G06F 13/26 |
| | | | | 710/261 |
| 8,738,663 | B2 * | 5/2014 | Gonzalez | G06F 17/30306 |
| | | | | 707/694 |
| 2005/0193157 | A1 * | 9/2005 | Kwon | G06F 13/24 |
| | | | | 710/260 |
| 2009/0248935 | A1 * | 10/2009 | Ehrlich | G06F 13/26 |
| | | | | 710/264 |
| 2010/0042372 | A1 * | 2/2010 | Carter | G01D 4/004 |
| | | | | 702/189 |

FOREIGN PATENT DOCUMENTS

| | | |
|---|---|---|
| JP | 10-107809 | 4/1998 |
| JP | 2004-086522 | 3/2004 |
| JP | 2006-236233 | 9/2006 |

* cited by examiner

FIG.3

| Address64 |
| --- |
| Address1 |
| Empty |
| Empty |
| Empty |
| Empty |

METHOD AND APPARATUS FOR IDENTIFYING CAUSE OF INTERRUPT

CROSS-REFERENCE TO RELATED APPLICATIONS

This application is based upon and claims the benefit of priority of the prior Japanese Priority Application No. 2013-055663 filed on Mar. 18, 2013, the entire contents of which are hereby incorporated by reference.

FIELD

The disclosures herein generally relate to a method and an apparatus for identifying cause of interrupt.

BACKGROUND

As communication speed and capacity of communication networks increase more and more, an amount of alarm information handled by a monitoring apparatus used in such a communication network also increases. In such a monitoring apparatus, an alarm generated in a network is sent to a microprocessor as an interrupt indicating signal, and the alarm that causes the interrupt is identified. However, with an increasing amount of alarm information, it takes a long time to identify the alarm, and workload of the microprocessor increases.

There are known methods of collecting alarm information such as a technology that aggregates alarm information using logical OR operations, or a technology that indicates a high-priority alarm by grouping alarms (see, for example, Patent Document 1 and Patent Document 2).

RELATED-ART DOCUMENTS

Patent Documents

[Patent Document 1] Japanese Laid-open Patent Publication No. 2004-86522
[Patent Document 2] Japanese Laid-open Patent Publication No. 5-81040

SUMMARY

According to at least one embodiment of the present invention, a method of identifying a cause of an interrupt related to an interrupt indication received from an interrupt indicating circuit in a processor, includes the steps of: having the interrupt indicating circuit provided with a plurality of lowest-layer registers having a plurality of bits, each of the plurality of bits corresponding to the cause of the interrupt, and one or more upper-layer registers for aggregating the plurality of lowest-layer registers; forming a hierarchical structure with the one or more upper-layer registers and the plurality of lowest-layer register; and identifying the cause of the interrupt by having the processor read the upper-layer registers and the lowest-layer registers in order following the hierarchical structure.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 3 is a schematic view illustrating an example of information stored in a FIFO.

DESCRIPTION OF EMBODIMENTS

In the following, embodiments of the present invention will be described with reference to the drawings. According to at least one embodiment of the present invention, it is possible to reduce the number of read operations and to shorten processing time when processing an interrupt indication by a processor.

According to an embodiment of the present invention, a cause of an interrupt is identified by reading hierarchically structured registers from an upper layer to a lower layer in order, which reduces the number of read operations and shortens processing time.

<Interrupt Indicating Circuit>

Figure 1:
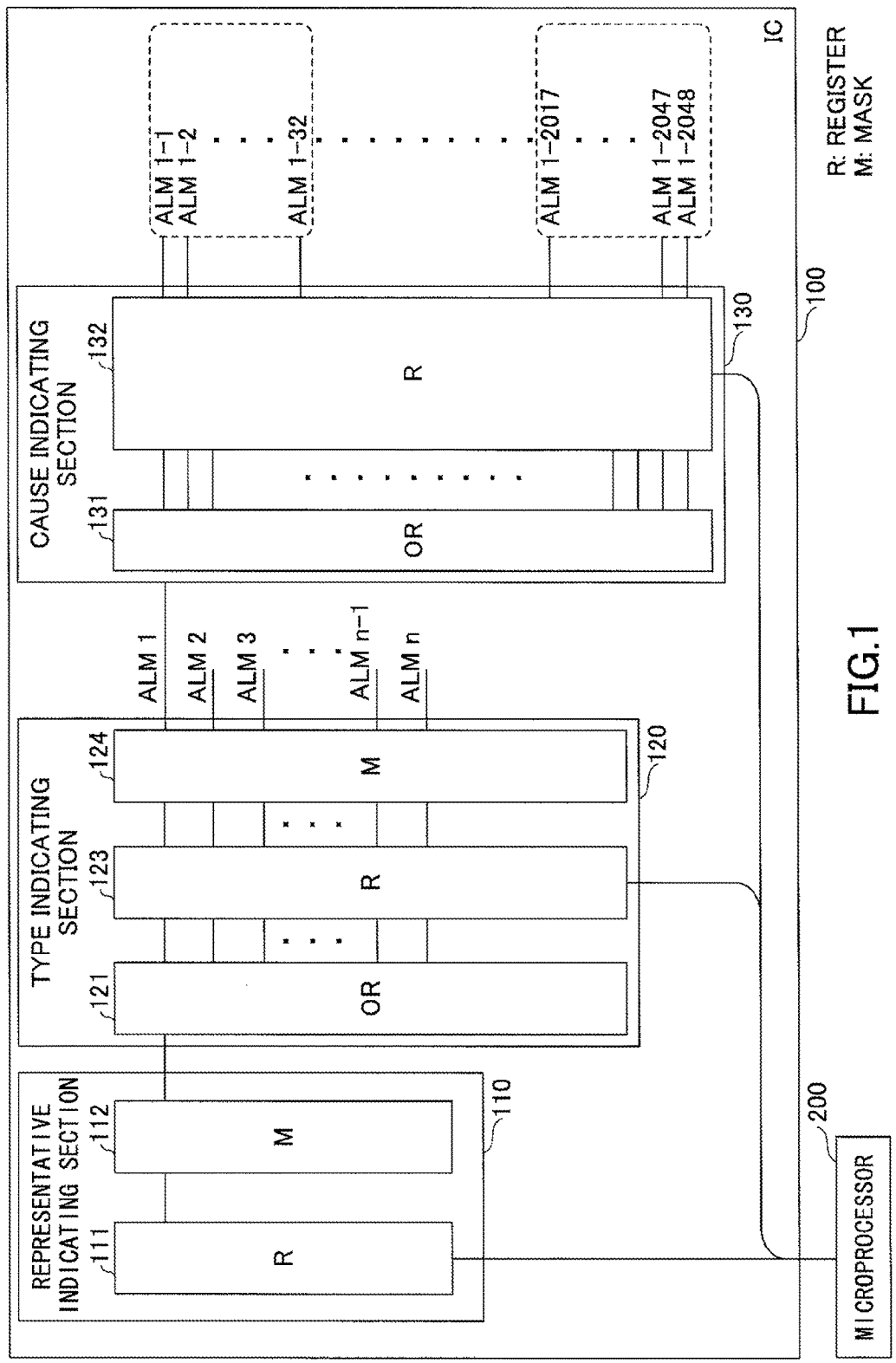
FIG. 1 is a configuration diagram of a conventional interrupt indicating circuit.

A configuration of a conventional interrupt indicating circuit will be described with reference to FIG. 1. In FIG. 1, an IC 100 sends an interrupt indication to a microprocessor 200.

The IC 100 includes a representative indicating section 110, a type indicating section 120, and a cause indicating section 130. The representative indicating section 110 includes a register 111 and a mask 112. The type indicating section 120 includes a logical OR (OR) circuit 121, a register 123, and a mask 124. The cause indicating section 130 includes an OR circuit 131 and a register 132.

When one or more alarms among 2048 alarms ALM1-1 to ALM1-2048 are indicated to the IC 100, corresponding bits in the register 132 of the cause indicating section 130 are written. The register 132 may be a read-clear-type register. If at least one bit of the register 132 is written into, the OR circuit 131 indicates to the type indicating section 120 that an alarm is generated. Although FIG. 1 illustrates only one cause indicating section 130 that handles only one type of alarm, n duplicates of the cause indicating section 130 are provided to indicate n types of alarms.

If there is one or more alarms among the n types of alarms, the type indicating section 120 selects an alarm to indicate by the mask 124, to write it into a corresponding bit in the register 123. The register 123 may be a read-only-type register. The mask 124 for selecting an alarm may be set and changed by the microprocessor 200, or determined beforehand. Alternatively, the mask 124 may be omitted. If at least one bit of the register 123 is written into, the OR circuit 121 indicates to the representative indicating section 110 that an alarm is generated.

If an alarm is indicated, the representative indicating section 110 selects an alarm to indicate by the mask 112, to write it into a bit in the register 111. The register 111 may be a read-only-type register. The mask 112 for selecting an alarm may be set and changed by the microprocessor 200, or determined beforehand. Alternatively, the mask 112 may be omitted. If a bit of the register 111 is written into, the representative indicating section 110 indicates to the microprocessor 200 that an alarm is generated. The microprocessor 200 processes this indication as an interrupt indication.

If detecting an interrupt signal, the microprocessor 200 executes steps for identifying the cause of the interrupt. First, the microprocessor 200 reads the register 111 of the representative indicating section 110 to determine whether an alarm is indicated.

Next, if an alarm is indicated, for example, "1" is written into the register 111 to indicate an alarm state, the microprocessor 200 reads the register 123 of the type indicating section 120 to identify the type of an indicated alarm. For example, it identifies which bit of the register 123 corresponding to one of ALM1-ALM1n is written to.

Moreover, the microprocessor 200 reads the register 132 of the indicating section 130 that corresponds to the identified alarm type to identify the indicated alarm. For example, if a bit corresponding to ALM1 in the register 123 is written to, the register 132 of the cause indicating section 130 corresponding to ALM1 is read, then the microprocessor 200 identifies a bit that corresponds to one of the alarms ALM1-1 to ALM1-2048 among multiple bits in the register 132.

In this way, the microprocessor 200 identifies the alarm that causes an interrupt by reading the registers 111, 123, and 132 of the IC 100 in order.

However, for example, if there are 2048 channels for ALM1, and a bus between the IC 100 and the microprocessor 200 is 32 bits wide, the microprocessor 200 needs to repeat read operations on the register 132 with units of 32 bits as illustrated with dashed lines in FIG. 1. Therefore, the microprocessor 200 needs to execute read operations once, once and 64 (=2048/32) times on the registers 111, 123, and 132, respectively, which sums up to 66 read operations.

Therefore, the number of read operations increases for a microprocessor that monitors a greater number of alarms, which takes a longer time to identify an alarm. Also, in a network with a considerable number of communication channels, the number of read operations increases for a microprocessor in a monitoring apparatus, which also takes a longer time to identify an alarm.

<Interrupt Indicating Circuit with Hierarchical Structure>

Figure 2:
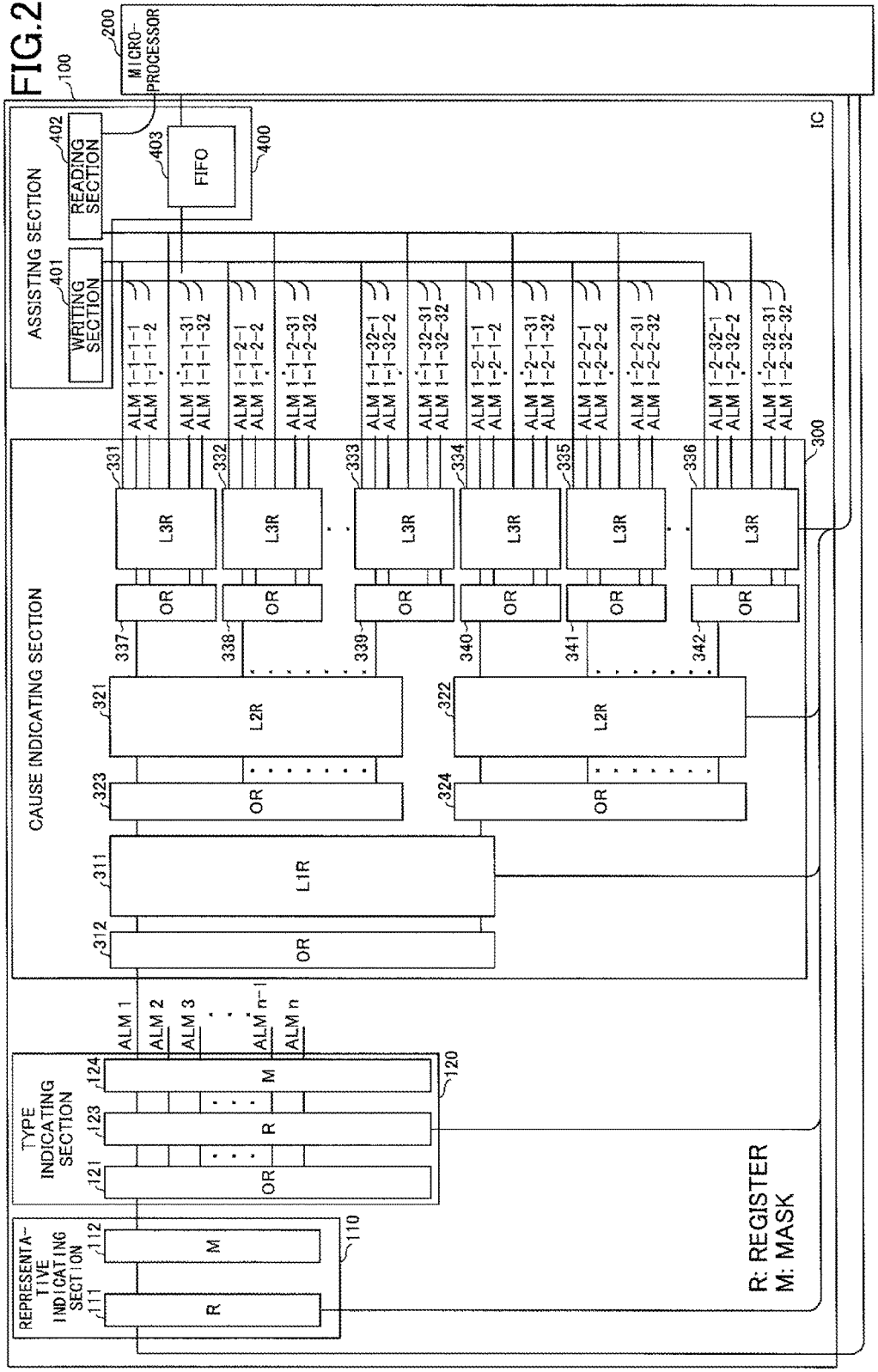
FIG. 2 is a configuration diagram of an interrupt indicating circuit according to an embodiment of the present invention.

Next, a configuration of an interrupt indicating circuit will be described according to the present embodiment of the present invention with reference to FIG. 2. In FIG. 2, similarly to FIG. 1, an IC 100 sends an interrupt indication to a microprocessor 200.

The IC 100 includes a representative indicating section 110, a type indicating section 120, a cause indicating section 300, and an assisting section 400. Configurations of the representative indicating section 110 and the type indicating section 120 are the same as in FIG. 1, respectively, and their description is omitted.

The cause indicating section 300 includes third layer (L3) registers 331-336, OR circuits 337-342, second layer (L2) registers 321-322, OR circuits 323-324, a first layer (L1) register 311, and an OR circuits 312.

Alarms are hierarchically structured, and the corresponding L1-L3 registers also have a hierarchical structure. The L3 registers 331-336 at the lowest layer have multiple bits that correspond to a minimum unit of alarms, respectively. In FIG. 2, each of the L3 registers 331-336 has 32 bits to be fitted to a bus width of 32 bits.

Each of the L2 registers at one layer above also has 32 bits to aggregate the 32 L3 registers.

The L1 register at one layer above the L2 registers has two bits to aggregate the two L2 registers.

In FIG. 2, there are 64 32-bit L3 registers for handling 2048 alarms. The number of L3 registers may be discretionarily determined, which may be more than 64 or less than 64. Also, the number of layers included in the hierarchical structure may be discretionarily determined, for example, based on an alternative bus width such as 64 bits, an alternative number of alarms, and the like.

For example, a four-layer hierarchical structure may be adopted for handling 65536 alarms. In this case, there are 2048 32-bit lowest-layer (fourth layer, L4) registers, 64 third-layer (L3) registers, each of which aggregates 32 L4 registers, two second-layer (L2) registers, each of which aggregates 32 L3 registers, and one uppermost-layer (first layer, L1) register to aggregate two L2 registers.

The circuit in FIG. 2 handles the same number of alarms as the circuit in FIG. 1. However, the alarms in FIG. 2 are partitioned into 64 groups including ALM1-1-1-1 to ALM1-1-1-32, ALM1-1-32-1 to ALM1-1-32-32, ALM1-2-1-1 to ALM1-2-1-32, . . . , ALM1-2-32-1 to ALM1-2-32-32, respectively.

The L3 register 331 handles the alarms ALM1-1-1-1 to ALM1-1-1-32. The L3 register 332 handles the alarms ALM1-1-2-1 to ALM1-1-2-32. Similarly, the L3 register 336 handles the alarms ALM1-2-32-1 to ALM1-2-32-32, and so forth.

The L3 registers 331-336 are connected with OR circuits 337-342, respectively. The OR circuits 337-339 are connected with the L2 register 321. The L2 register 321 is connected with the L1 register 311 via the OR circuit 323. On the other hand, the OR circuits 340-342 are connected with L2 register 322. The L2 register 322 is connected with the L1 register 311 via the OR circuit 324.

If one or more alarms among the 2048 alarms ALM1-1-1-1 to ALM1-2-32-32 are indicated to the IC 100, the corresponding bits of the L3 registers 331-336 of the cause indicating section 300 are written. If at least one bit of the L3 registers 331-336 is written, the OR circuits 337-342 connected with the written L3 registers write the corresponding bits in the L2 registers 321-322. Moreover, if at least one bit in the L2 registers 321-322 is written, the OR circuits 323-324 connected with the written L2 registers write the corresponding bits in the L1 register 311.

For example, if the alarm ALM1-2-32-32 is indicated in FIG. 2, the corresponding bit in the L3 register 336 is written. Next, the OR circuit 342 writes a bit in the L2 register 322 corresponding to ALM1-2-32-1 to ALM1-2-32-32. The OR circuit 324 writes a bit in the L1 register 311 corresponding to ALM1-2-1 to ALM1-2-32. If the bit in the L1 register 311 is written, the OR circuit 312 indicates to the type indicating section 120 that an alarm is generated.

Operations of the representative indicating section 110 and the type indicating section 120 are the same as in FIG. 1, and their description is omitted. Although FIG. 2 illustrates only one cause indicating section 300 that handles only one type of alarm, n duplicates of the cause indicating section 300 are provided to indicate n types of alarms.

In response to receiving an interrupt indication, the microprocessor 200 executes steps to identify the cause of the interrupt. Similarly to FIG. 1, first, the microprocessor 200 reads the register 111 of the representative indicating section 110 to determine there exists an alarm, then identifies the type of the alarm by reading the register 123 of the type indicating section 120.

Having identified the alarm type, the microprocessor 200 reads the L1 register 311 of the cause indicating section 300 to identify the first layer (uppermost layer) of the alarm in the hierarchical structure. Next, the microprocessor 200 reads the L2 register 321 or 322 corresponding to the alarm in the identified first layer, to identify the second layer (second to uppermost layer) of the alarm. Moreover, the microprocessor 200 reads one of the L3 registers 331-336 corresponding to the alarm in the identified second layer to identify the third layer (third to uppermost layer, the lowest layer in the example) of the alarm.

For example, similarly to the above example, if an alarm ALM1-2-32-32 is indicated, the microprocessor 200 executes steps for reading the registers of the cause indicating section 300 as follows.

First, the microprocessor 200 reads the register 123 of the type indicating section 120 similarly to FIG. 1 to identify the type of the alarm, then reads the L1 register 311 of the cause indicating section 130 corresponding to the type. The microprocessor 200 L1 identifies which bit is written in the L1 register 311 that has two bits corresponding to the alarm ALM1-1 and ALM1-2 in the first layer, respectively. Assume that the alarm ALM1-2 bit is written to in this example.

Next, the microprocessor 200 reads the L2 register 322 corresponding to the alarm ALM1-2 in the first layer. The microprocessor 200 identifies which bit is written in 32 bits of the L2 register 322 that corresponds to one of the alarms ALM1-2-1 to ALM1-2 -32 in the second layer. In the example, assume the bit corresponding to the alarm ALM1-2-32 is written.

Next, the microprocessor 200 reads the L3 register 336 corresponding to the alarm ALM1-2-32 in the second layer. The microprocessor 200 identifies which bit is written in 32 bits of the L3 register 336 that corresponds to one of the alarms ALM1-2-32-1 to ALM1-2-32-32 in the third layer. In the example, assume the bit corresponding to the alarm ALM1-2-32 -32 is written.

In this way, the microprocessor 200 reads the registers 111 and 123, the L1 register, the L2 register, and the L3 register in the IC 100 in order to identify the alarm that causes the interrupt.

If ALM1 is provided for 2048 channels and the bus is 32 bits wide similarly to FIG. 1, only five read operations are required for identifying an alarm that causes an interrupt using the circuit in FIG. 2, which are read operations on the registers 111, 123 and the L1-L3 registers. Therefore, the number of read operations can be reduced considerably using the circuit in FIG. 2 compared to the circuit in FIG. 1. Thus, time for identifying an alarm by the microprocessor of a monitoring apparatus can be shortened.

The IC 100 in FIG. 2 may further include the assisting section 400 for further reducing the number of read operations if multiple alarms are generated. The assisting section 400 includes a writing section 401, a reading section 402, and a first-in first-out memory (FIFO) 403.

The writing section 401 writes a bit, for an alarm indicated to the IC 100, into the corresponding bit in one of the L3 registers 331-336. Every time the writing section 401 writes a bit into one of the L3 registers 331-336, it stores the address of the written into L3 register into the FIFO 403.

The reading section 402 makes the microprocessor 200 read a L3 register by outputting the content of the L3 register on the bus. The address of the L3 register is specified and indicated to the reading section 402 by the microprocessor 200.

The FIFO 403 stores the address of a L3 register that has been written in by the writing section 401 on a first-in first-out basis. If the L1 register is read by the microprocessor 200, one L3 register address that has been stored in the FIFO 403 is taken out from the FIFO 403. Timing to take out an address stored in the FIFO 403 may be determined discretionally, for example, timing when reading one of the L2 registers or L3 registers.

When an L3 register is written in with an alarm, the writing section 401 stores the address of the written in L3 register into the FIFO 403 in order. When the microprocessor 200 reads the L1 register to identify the alarm, the microprocessor 200 takes out an L3 register address from the FIFO 403, and determines whether any other addresses are stored in the FIFO 403. If the other addresses are stored in the FIFO 403, the microprocessor 200 reads an L3 register corresponding to the address stored in the FIFO 403 to identify the alarm. If multiple alarms need to be identified consecutively, it is possible to reduce the number of read operations further by directly reading the L3 registers whose addresses are stored in the FIFO 403, without reading the L1 and L2 registers.

For example, assume that after an alarm ALM1-2-32-32 has been generated as above, another alarm ALM1-1-1-1 is further generated. In response to the alarm ALM1-2-32-32, the writing section 401 has written the corresponding bit in the L3 register 336, and has stored the address of the L3 register 336 into the FIFO 403. The alarm has been indicated to the microprocessor 200 as above, and the microprocessor 200 has identified the alarm.

When the alarm ALM1-1-1-1 is generated, the writing section 401 writes a bit in the L3 register 331 corresponding to the alarm ALM1-1-1-1, and stores the address of L3 register 331 into the FIFO 403.

FIG. 3 illustrates an example of information stored in the FIFO for a case where two alarms ALM1-2-32-32 and ALM1-1-1-1 are generate consecutively. Address64 represents the address of the L3 register 336, and Address1 represents the address of the L3 register 331. No addresses are stored in the FIFO 403 after Address1 (designated with Empty) because no alarms are generated after the alarm ALM1-1-1-1.

Figure 4:
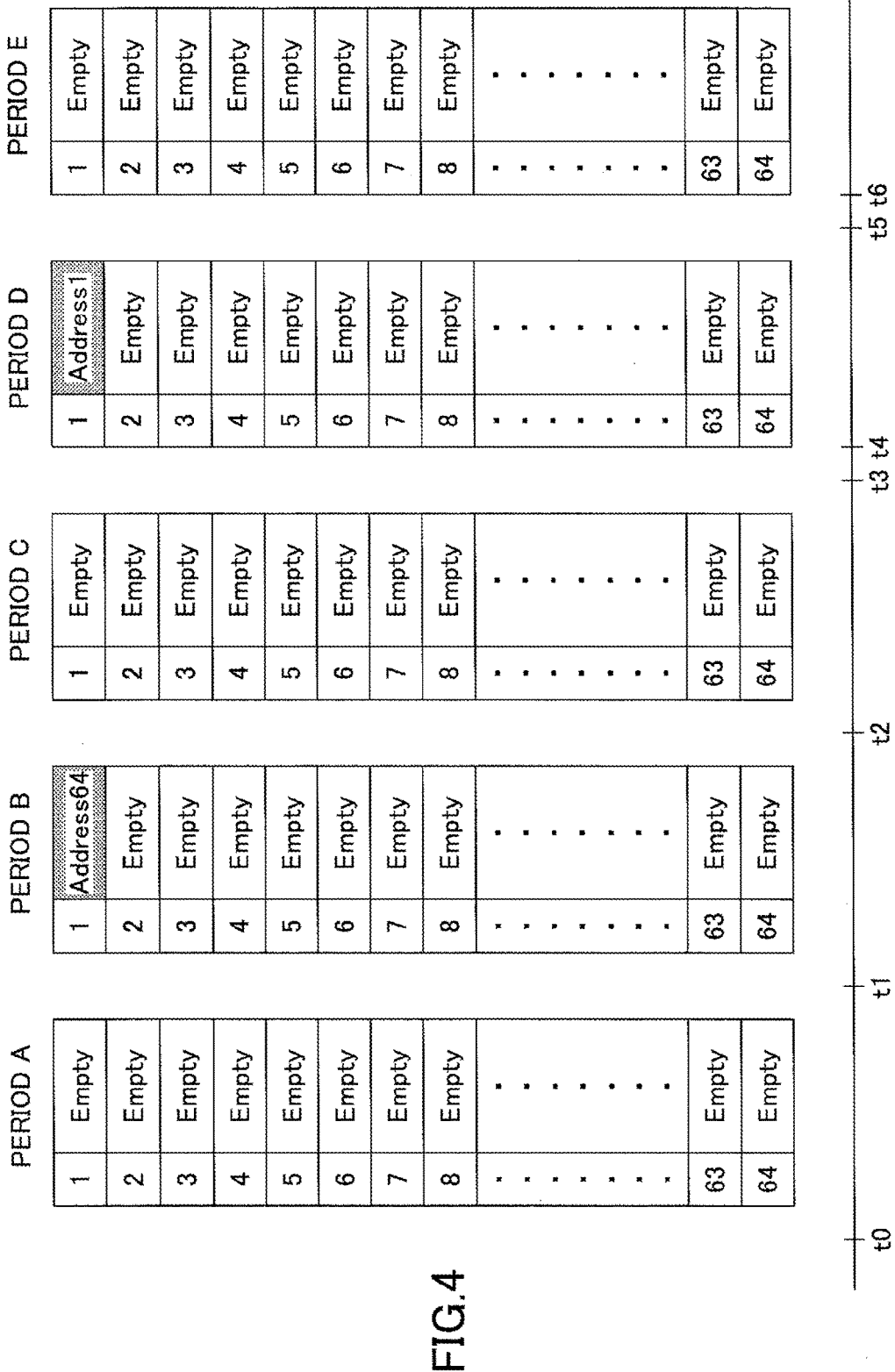
FIG. 4 is a schematic view illustrating an example of temporal change of information stored in a FIFO.

An example of temporal change of information stored in the FIFO 403 will be described with reference to FIG. 4. In FIG. 4, the horizontal axis represents time, and information stored in the FIFO 403 during periods A-E are illustrated with respective tables. Although the FIFO 403 is illustrated with 64 lines in FIG. 4, the number of lines may be determined discretionally to be more or less than 64.

As no alarms are generated at time t0, all lines of the FIFO 403 remain Empty as illustrated with period A. The microprocessor 200 is in a state with no interrupt.

When an alarm ALM1-2-32-32 is generated at time t1, the writing section 401 writes a bit into the corresponding L3 register 336, and stores the address of the L3 register 336, Address64, into the FIFO 403 as illustrated with period B. The microprocessor 200 receives an interrupt indication from the IC 100, starts the steps for identifying an alarm that causes the interrupt, and transitions into a state with interrupt.

At time t2, the microprocessor 200 reads the L1 register 311, and takes out the address of L3 register 336, Address64, stored in the FIFO 403 by reading it. With this operation, the FIFO 403 has all Empty lines again as illustrated with period C. Although all lines of the FIFO 403 become Empty, the microprocessor 200 remains in the state with interrupt because it is in the course of steps for identifying the alarm.

When another alarm ALM1-1-1-1 is generated at time t3, the writing section 401 writes a bit into the corresponding L3 register 331, and stores the address of the L3 register 331, Address1, into the FIFO 403 as illustrated with period D. The microprocessor 200 receives another interrupt indication generated with the alarm ALM1-1-1-1, and remains in the state with interrupt.

At time t4, the microprocessor 200 reads the L3 register 336 corresponding to the alarm ALM1 -2-32-32, to conclude the steps for identifying this alarm. However, it remains in the state with interrupt because it is in the course of steps for identifying the other alarm ALM1-1-1-1.

At time t5, the microprocessor 200 reads the L1 register 331, and takes out the address of the L3 register 331, Address1, stored in the FIFO 403 by reading it. With this operation, the FIFO 403 has all Empty lines again as illustrated with period E.

At time t6, the microprocessor 200 directly reads the L3 register 331 corresponding to the alarm ALM1-1-1-1 with Address1 taken out from the FIFO 403 at time t5. When executing the steps for identifying the preceding alarm ALM1-2-32-32, the microprocessor 200 reads the registers in order starting from the uppermost layer. On the other hand, with the steps for identifying the succeeding alarm ALM1-1-1-1, the microprocessor 200 does not need to read the L1 and L2 registers at upper layers, but reads only the L3 register at the lowest layer. The microprocessor 200 concludes the steps for identifying the alarm by reading the L3 register 331. Here, the lines of the FIFO 403 become all Empty, which implies that no other L3 registers are written in as no other alarms are generated at the moment. The microprocessor 200 goes back to the state with no interrupt.

In this way, by storing the address of a written in L3 register into the FIFO and directly reading the L3 register with the address stored in the FIFO by the microprocessor, it is possible to reduce the number of read operations and to shorten processing time of the microprocessor.

<Method of Identifying Cause of Interrupt>

Figure 5:
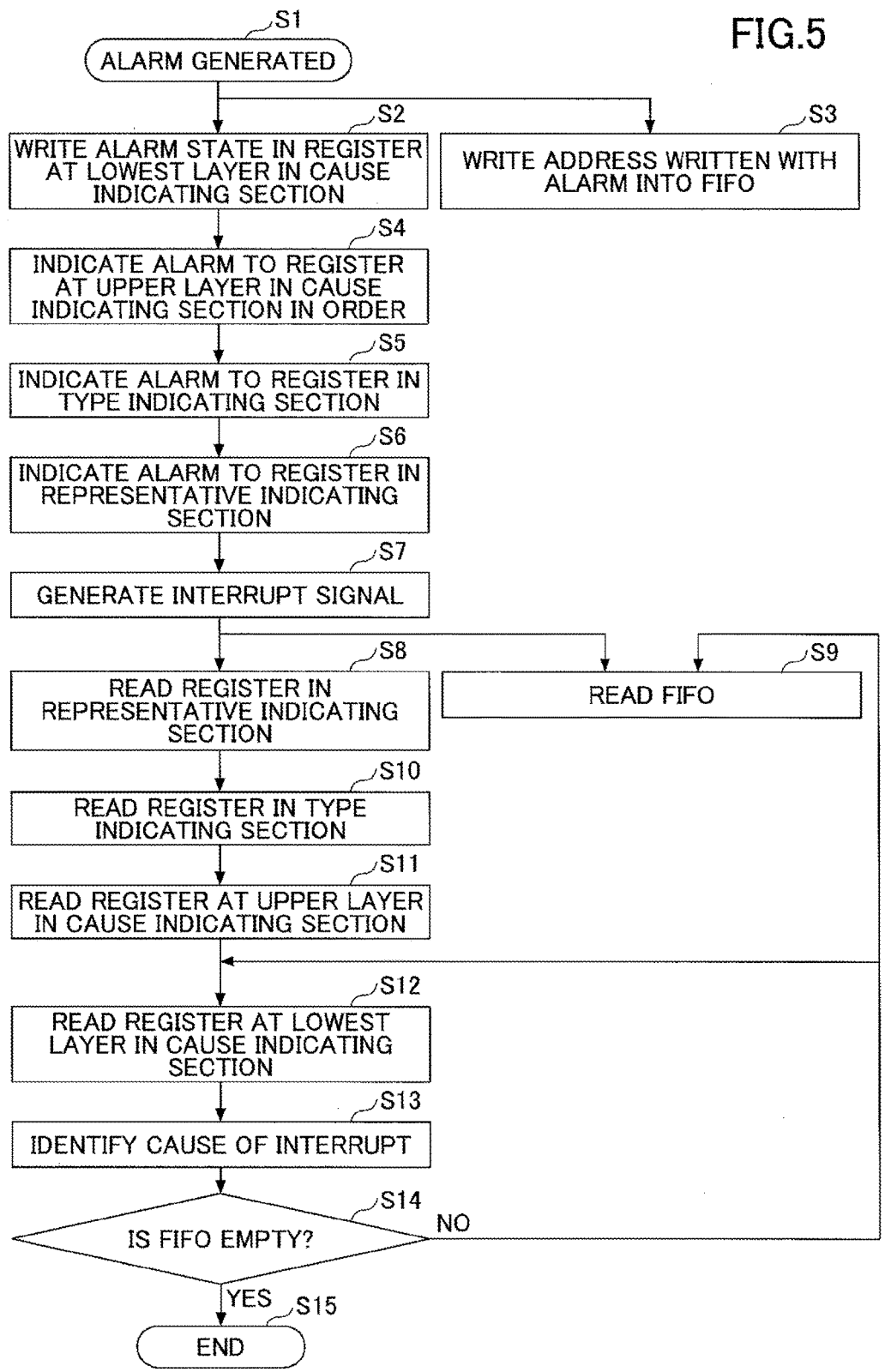
FIG. 5 is a flowchart illustrating a method of identifying cause of interrupt according to an embodiment of the present invention.

A method of identifying the cause of an interrupt will be described according to the present embodiment of the present invention with reference to FIG. 5. The method illustrated in FIG. 5 is executed by the IC 100 and microprocessor 200 illustrated in FIG. 2.

At Step S1, an alarm is generated.

At Step S2, the alarm generated at Step S1 is indicated to the IC 100, and the writing section 401 writes the alarm state bit into one of the L3 registers 331-336 at the lowest layer.

At Step S3, the writing section 401 stores the address of the one of the L3 registers 331-336 at the lowest layer with the alarm state bit written at Step S2, into the FIFO 403.

At Step S4, the alarm state bit is written into the L1 and L2 registers at the upper layers in order that corresponds to the L3 register with the alarm state bit written at Step S2. At Step S4, the alarm is indicated to the L2 and L1 registers of the cause indicating section 300.

At Step S5, the alarm state bit is written into the register 123 of the type indicating section 120 that corresponds to the cause indicating section 300 with the alarm state bit written in at Step S4.

At Step S6, the alarm state bit is written into the register 111 of the representative indicating section 110.

At Step S7, the IC 100 generates an interrupt indication signal to send it to the microprocessor 200.

At Step S8, the microprocessor 200 reads the register 111 of the representative indicating section 110 to find that an alarm is indicated.

At Step S9, the microprocessor 200 reads the address of a L3 register stored in the FIFO 403 on a first-in first-out basis.

At Step S10, the microprocessor 200 reads the register 123 of the type indicating section 120 to identify the type of the indicated alarm among ALM1-ALMn.

At Step S11, the microprocessor 200 reads the L1 and L2 registers at the upper layers of the cause indicating section 300 in order, to identify the L3 register corresponding to the indicated alarm.

At Step S12, the microprocessor 200 reads the L3 register identified at Step S11.

At Step S13, the microprocessor 200 identifies the alarm that causes the interrupt by determining which bit of the L3 register read at Step S12 has the alarm state bit written in.

At Step S14, the microprocessor 200 determines whether the FIFO 403 is empty.

At Step S14, if the FIFO 403 is not empty, the procedure goes back to Step S9 to have the microprocessor 200 take out the address of the L3 register stored in the FIFO 403. In addition, at Step S12, the L3 register is read that corresponds to the address taken out at Step S9. At this moment, the microprocessor 200 may indicate the address of the L3 register taken out from the FIFO 403 to the reading section 402 to have the reading section 402 output the content of the L3 register having the indicated address on the bus, to be read by the microprocessor 200.

At Step S14, if the FIFO 403 is empty, the procedure ends at Step S15.

<Apparatus Configuration>

An example of apparatus configuration will be described according to the present embodiment of the present invention with reference to FIG. 6. The apparatus in FIG. 6 includes a control section 600 and communication channel interfaces #1-n 700. The number of the communication channel interfaces #1-n may be determined discretionally, and the communication channel interfaces #1-n may have the same configuration, or specific configurations, respectively.

The control section 600 includes a main interface 602 and a main CPU 601.

The main CPU 601 controls elements in the control section 600.

The main interface 602 collects alarm information from one or more communication channel interfaces #1-n, to indicate it to the main CPU 601.

The communication channel interface #1 includes a local CPU 701, a local interface 702, a switching section 703, a processing section 704, and a transmission/reception section 705.

The local CPU 701 controls elements in the communication channel interface #1.

The local interface 702 collects indicated alarm information with the processing section 704, to indicate it to the main interface 602.

The switching section 703 transfers a main signal received from the other communication channel interfaces or the like in the apparatus to the processing section 704, and transfers the main signal received from the processing section 704 to the other communication channel interfaces or the like. The switching section 703 may multiplex and/or separate the main signal.

The processing section 704 processes the main signal, and monitors and detects an alarm to indicate the alarm to the local interface 702.

The transmission/reception section 705 is connected with a communication channel, transmits data received from the processing section 704 to the communication channel, and transfers data received from the communication channel to the processing section 704.

Figure 6:
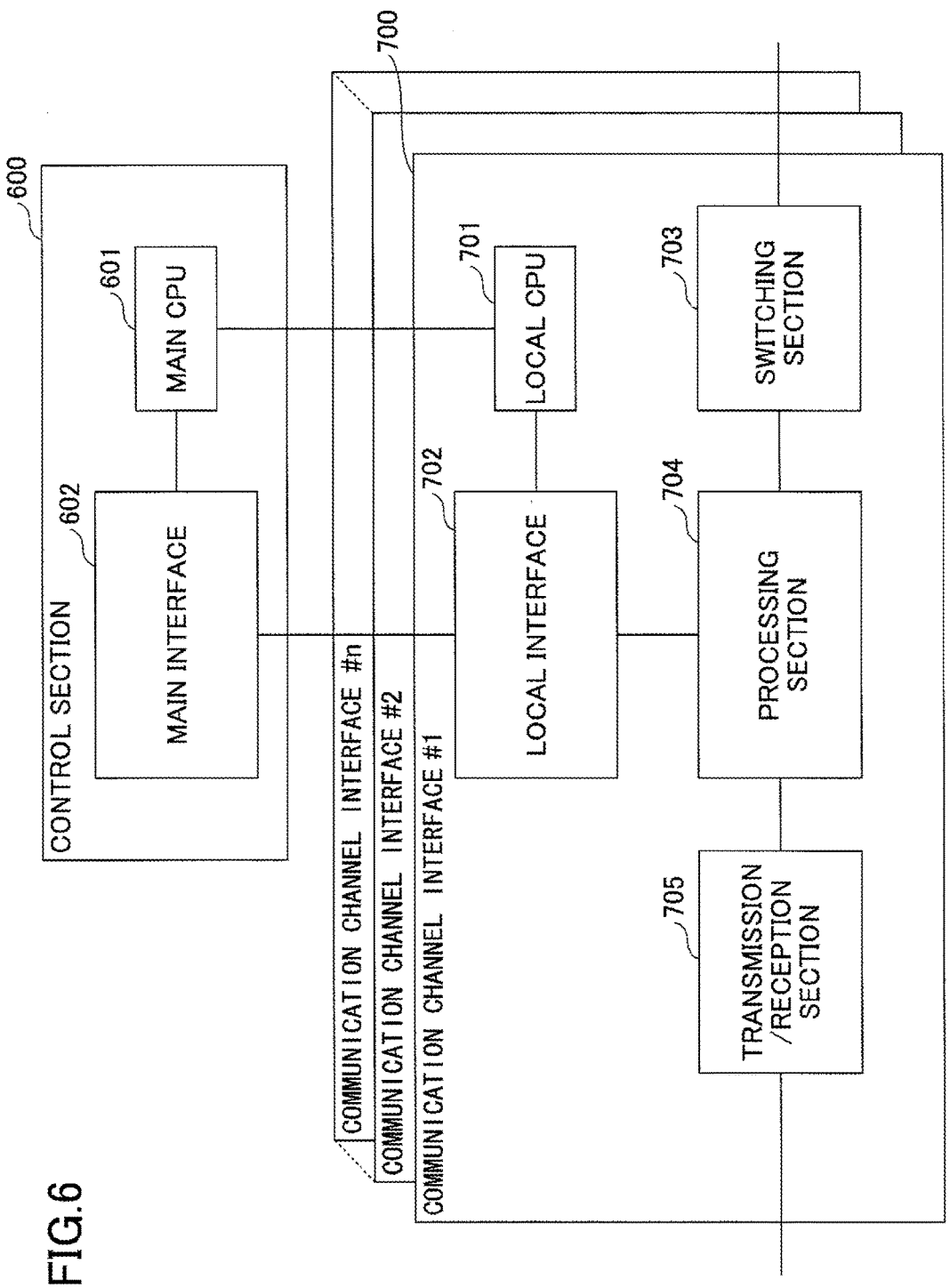
FIG. 6 is an example of an apparatus configuration diagram according to an embodiment of the present invention.

The IC 100 and the microprocessor 200 illustrated in FIG. 2 may be applicable to the main interface 602 and the main CPU 601 in FIG. 6, respectively, or the local interface 702 and the local CPU 701, respectively, or a combination of these.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of identifying a cause of an interrupt related to an interrupt indication received from an interrupt indicating circuit in a processor, the method comprising:
   providing in the interrupt indicating circuit
   a plurality of lowest-layer registers having a plurality of bits, each of the plurality of bits corresponding to the cause of the interrupt, and
   one or more upper-layer registers for aggregating the plurality of lowest-layer registers;
   forming a hierarchical structure with the one or more upper-layer registers and the plurality of lowest-layer register;
   when the processor receives a first interrupt indication from the interrupt indicating circuit, having the processor read the upper-layer registers and the lowest-layer registers in order following the hierarchical structure to identify a cause of a first interrupt; and
   when the processor receives a second interrupt indication while identifying the cause of the first interrupt related to the first interrupt indication, having the processor directly read the lowest-layer register corresponding to a cause of a second interrupt related to the second interrupt indication based on an address read from the interrupt indicating circuit, to identify the cause of the second interrupt.

2. The method as claimed in claim 1, further comprising providing in the interrupt indicating circuit a first-in first-out memory (FIFO) and a writing section, the writing section configured to write a bit into one of the lowest-layer registers in response to an occurrence of the cause of the interrupt, and to store the address of the lowest-layer register into the FIFO; and
   having the processor read the address stored in the FIFO every time the processor receives an interrupt indication.

3. The method as claimed in claim 1, wherein the processor reads one of the upper-layer registers in the hierarchical structure to identify one of the lower-layer registers to be read next.

4. The method as claimed in claim 1, wherein a number of bits included in each of the lowest-layer registers is equivalent to a number of bits being read with a single read operation executed by the processor.

5. The method as claimed in claim 1, wherein the cause of the interrupt is an alarm generated in a communication network.

6. An apparatus including a processor and an interrupt indicating circuit, comprising:
   the interrupt indicating circuit including
   a plurality of lowest-layer registers having a plurality of bits, each of the plurality of bits corresponding to a cause of an interrupt, and
   one or more upper-layer registers for aggregating the plurality of lowest-layer registers;
   wherein the one or more upper-layer registers and the plurality of lowest-layer register are configured to form a hierarchical structure; and
   when the processor receives a first interrupt indication from the interrupt indicating circuit, the processor reads the upper-layer registers and the lowest-layer registers in order following the hierarchical structure to identify a cause of a first interrupt; and
   when the processor receives a second interrupt indication while identifying the cause of the first interrupt related to the first interrupt indication, the processor directly reads the lowest-layer register corresponding to a cause of a second interrupt related to the second interrupt indication based on an address read from the interrupt indicating circuit, to identify the cause of the second interrupt.

7. The apparatus as claimed in claim 6, wherein the interrupt indicating circuit further includes a first-in first-out memory (FIFO) and a writing section, the writing section configured to write a bit in one of the lowest-layer registers in response to an occurrence of the cause of the interrupt, and to store an address of the lowest-layer register into the FIFO, and
   wherein the processor reads the address stored in the FIFO every time the processor receives an interrupt indication.

8. The apparatus as claimed in claim 6, wherein the processor reads one of the upper-layer registers in the hierarchical structure to identify one of the lower-layer registers to be read next.

9. The apparatus as claimed in claim 6, wherein a number of bits included in each of the lowest-layer registers is equivalent to a number of bits being read with a single read operation executed by the processor.

10. The apparatus as claimed in claim 6, wherein the cause of the interrupt is an alarm generated in a communication network.

* * * * *